US010883705B2

(12) United States Patent
Fox et al.

(10) Patent No.: US 10,883,705 B2
(45) Date of Patent: Jan. 5, 2021

(54) RAILROAD CROSSING GATE LAMP SYSTEM

(71) Applicant: RAILWAY EQUIPMENT COMPANY, Minneapolis, MN (US)

(72) Inventors: David K. Fox, Minneapolis, MN (US); Benjamin Moulton, Minneapolis, MN (US); Randall G. Honneck, Minneapolis, MN (US); Greggory C. Phelps, Minneapolis, MN (US)

(73) Assignee: Railway Equipment Company, Minneapolis, MN (US)

( * ) Notice: Subject to any disclaimer, the term of this patent is extended or adjusted under 35 U.S.C. 154(b) by 297 days.

(21) Appl. No.: 15/872,461

(22) Filed: Jan. 16, 2018

(65) Prior Publication Data

US 2018/0202636 A1 Jul. 19, 2018

Related U.S. Application Data

(60) Provisional application No. 62/445,794, filed on Jan. 13, 2017.

(51) Int. Cl.

| | |
|---|---|
| ***F21V 21/002*** | (2006.01) |
| ***B61L 29/22*** | (2006.01) |
| ***H01R 4/2406*** | (2018.01) |
| ***B61L 29/04*** | (2006.01) |
| ***B61L 29/28*** | (2006.01) |
| ***F21V 21/116*** | (2006.01) |
| ***F21V 23/06*** | (2006.01) |
| ***H01R 13/622*** | (2006.01) |
| ***H01R 4/26*** | (2006.01) |

(Continued)

(52) U.S. Cl.

CPC ............ *F21V 21/002* (2013.01); *B61L 29/04* (2013.01); *B61L 29/22* (2013.01); *B61L 29/28* (2013.01); *F21V 21/116* (2013.01); *F21V 23/002* (2013.01); *F21V 23/06* (2013.01); *H01R 4/2406* (2018.01); *H01R 13/622* (2013.01); *B61L 2207/02* (2013.01); *F21W 2111/02* (2013.01); *H01R 4/26* (2013.01); *H01R 13/5804* (2013.01); *H01R 24/86* (2013.01); *H01R 2105/00* (2013.01)

(58) Field of Classification Search

CPC .... F21V 21/002; F21V 21/116; F21V 23/002; F21V 23/06; B61L 29/04; B61L 29/22; B61L 29/28; H01R 4/2406; H01R 4/26; H01R 4/86; H01R 13/622

USPC ..................... 246/477, 482, 483, 484, 473 R

See application file for complete search history.

(56) References Cited

U.S. PATENT DOCUMENTS 494,390 A 3/1893 Smith
516,049 A 3/1894 Harden
(Continued)

FOREIGN PATENT DOCUMENTS

DE 2451743 A1 5/1976
FR 0715690 A 12/1931
(Continued)

*Primary Examiner* — Jason C Smith
(74) *Attorney, Agent, or Firm* — Merchant & Gould P.C.

(57) ABSTRACT

The present disclosure provides a new gate lamp system and method. The system and method is configured to facilitate the installation of a gate lamp onto a gate arm, and to facilitate the replacement of one or more of the gate lamps. The present disclosure provides a system and method of installing gate lamps on a gate arm in the field in a robust manner with ease.

14 Claims, 16 Drawing Sheets

(51) Int. Cl.

| | |
|---|---|
| ***F21V 23/00*** | (2015.01) |
| *H01R 13/58* | (2006.01) |
| *F21W 111/02* | (2006.01) |
| *H01R 24/86* | (2011.01) |
| *H01R 105/00* | (2006.01) |

(56) References Cited

U.S. PATENT DOCUMENTS 545,701 A 9/1895 Lattig
752,959 A 2/1904 Currier
913,974 A 3/1909 Pettey
1,211,676 A 1/1917 Coleman
1,818,625 A 8/1931 Hunter
2,386,161 A 10/1945 Hawes
2,598,196 A * 5/1952 Staley .................. B61L 29/243 246/130
2,792,559 A * 5/1957 Maberry ................ H01R 29/00 439/53
3,036,146 A 5/1962 Kamen
3,251,069 A 5/1966 Clark
3,538,484 A * 11/1970 Fassafiume ............ H01B 7/065 439/357
3,964,704 A * 6/1976 Karr ........................ B61L 29/02 246/125
3,994,457 A 11/1976 Teasel
4,053,760 A * 10/1977 Glazier .................. F21V 15/00 362/186
4,067,523 A * 1/1978 Kenny .................... B61L 29/04 246/125
4,068,966 A * 1/1978 Johnson ................ F16B 7/0433 174/47
4,186,429 A 1/1980 Johnston
4,449,168 A 5/1984 Ewing
4,460,811 A * 7/1984 Murr ...................... H01R 13/70 200/11 TW
4,523,256 A * 6/1985 Small ..................... G03B 15/02 248/125.1
4,666,108 A * 5/1987 Fox ......................... B61L 29/24 246/125
4,784,356 A 11/1988 Fox
7,075,427 B1 * 7/2006 Pace ....................... B61L 23/06 246/125
9,272,721 B2 * 3/2016 Bohme ................... B61L 29/10
9,701,328 B2 * 7/2017 Martin .................... B61L 29/28
2005/0284987 A1 * 12/2005 Kande ..................... B61L 29/16 246/125
2009/0007661 A1 * 1/2009 Nasiri ................ G01C 19/5769 73/504.03
2009/0194642 A1 * 8/2009 Honeck ................... B61L 29/30 246/114 R
2014/0028289 A1 * 1/2014 Ohnemus ............ H02M 3/3353 324/127
2018/0202636 A1 * 7/2018 Fox ....................... F21V 21/116

FOREIGN PATENT DOCUMENTS

FR 993578 A 11/1951
GB 0324007 A 1/1930
GB 0701030 A 12/1953
GB 1480992 A 10/1975

* cited by examiner

RAILROAD CROSSING GATE LAMP SYSTEM

CROSS-REFERENCE TO RELATED APPLICATION

This application claims the benefit of U.S. Patent Application Ser. No. 62/445,794, filed Jan. 13, 2017, the disclosure of which is hereby incorporated by reference in its entirety.

BACKGROUND

Railroad crossing arms are in widespread use as traffic barriers at railroad road crossings. The crossing arms are normally positioned upright and are lowered to a horizontal position when an approaching train is detected. The crossing arms of railroad crossing gates are typically provided with various signal lights that are secured to the crossing arm.

Conventionally, three signal lights are used. A first light is disposed at the far end of the crossing arm. The remaining two lights are generally spaced along the crossing arm. It is conventional that the lights be incorporated into an electrical circuit such that the light at the far end is constantly illuminated when the crossing arm is in its horizontal position. The remaining signal lights are configured such that they alternately flash off and on. Other configurations have also been used.

The environments in which railroad crossing gates are employed are often harsh. Therefore, from time to time the gate lamps need to be replaced due to damage to the lamps and or damage to the gate arm itself. There is a need for gate lamp systems that are robust, modular, and easy and efficient to install.

SUMMARY

The present disclosure provides a new gate lamp system and method. The system and method is configured to facilitate the installation of the gate lamp onto a gate arm and to facilitate the replacement of one or more of the gate lamps. The present disclosure provides a system and method of installing gate lamps on a gate arm in the field in a robust manner with relative ease.

DETAILED DESCRIPTION

Figure 1:
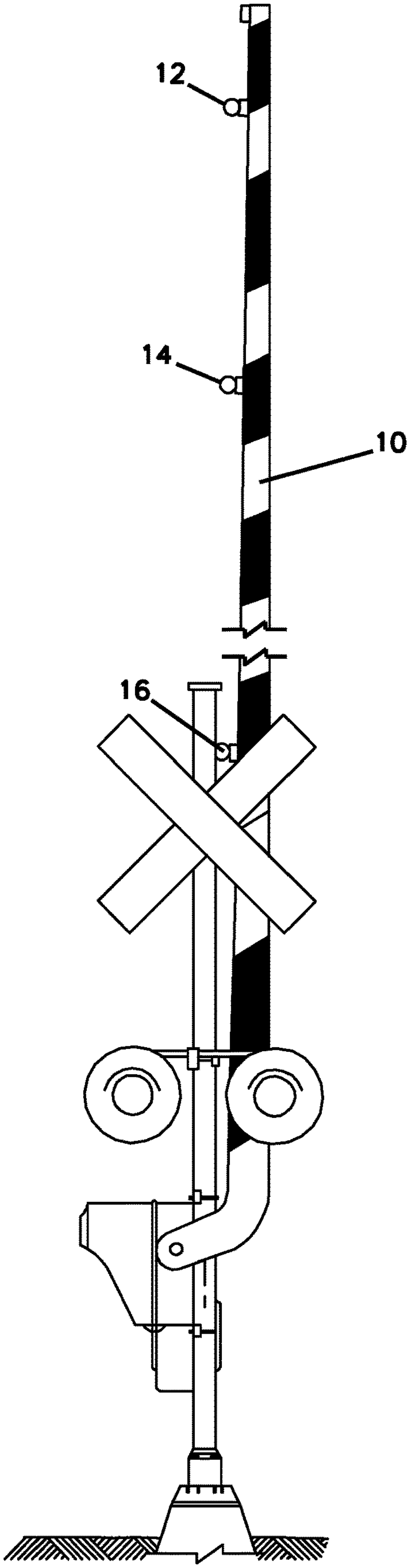
FIG. 1 is an illustration of a gate arm with a number of gate lamps mounted thereon.

Referring to the FIGS. generally, the present disclosure is described in further detail below. FIG. 1 illustrates an example cross gate arm. As is typical, the gate includes an arm 10 that pivots from a generally vertical position (as shown) to a generally horizontal position. The arm typically includes a plurality of lamps 12, 14, and 16 mounted thereon. Typically the gates include three lamps. When a train is near the distal lamp 12, the lamp lights up and stays on whereas the middle lamp 14 and the proximal lamp 16 flash in an alternating sequence. It should be appreciated that many other alternative configurations are also possible.

In the depicted embodiment, the lamps 12, 14 and 16 are EZ Gate® LED Lamps with Light Out Detection (LOD). They are railroad crossing gate arm lamps that adjust their operating current based on whether or not the lamp illuminates. The purpose of such lamps 12, 14 and 16 is to provide light at the gate arm 10 and to provide electrical feedback of their state of illumination. It should be understood that although in the depicted embodiment the lamps are EZ Gate® LED lamps with Light Out Detection, the lamps 12, 14 and 16 could alternatively be any other type of light emitting diodes (LED) or a non-LED lamp such as an ordinary incandescent bulb. It should be appreciated that the terms "lamp" and "light" are used interchangeably herein.

Figure 2:
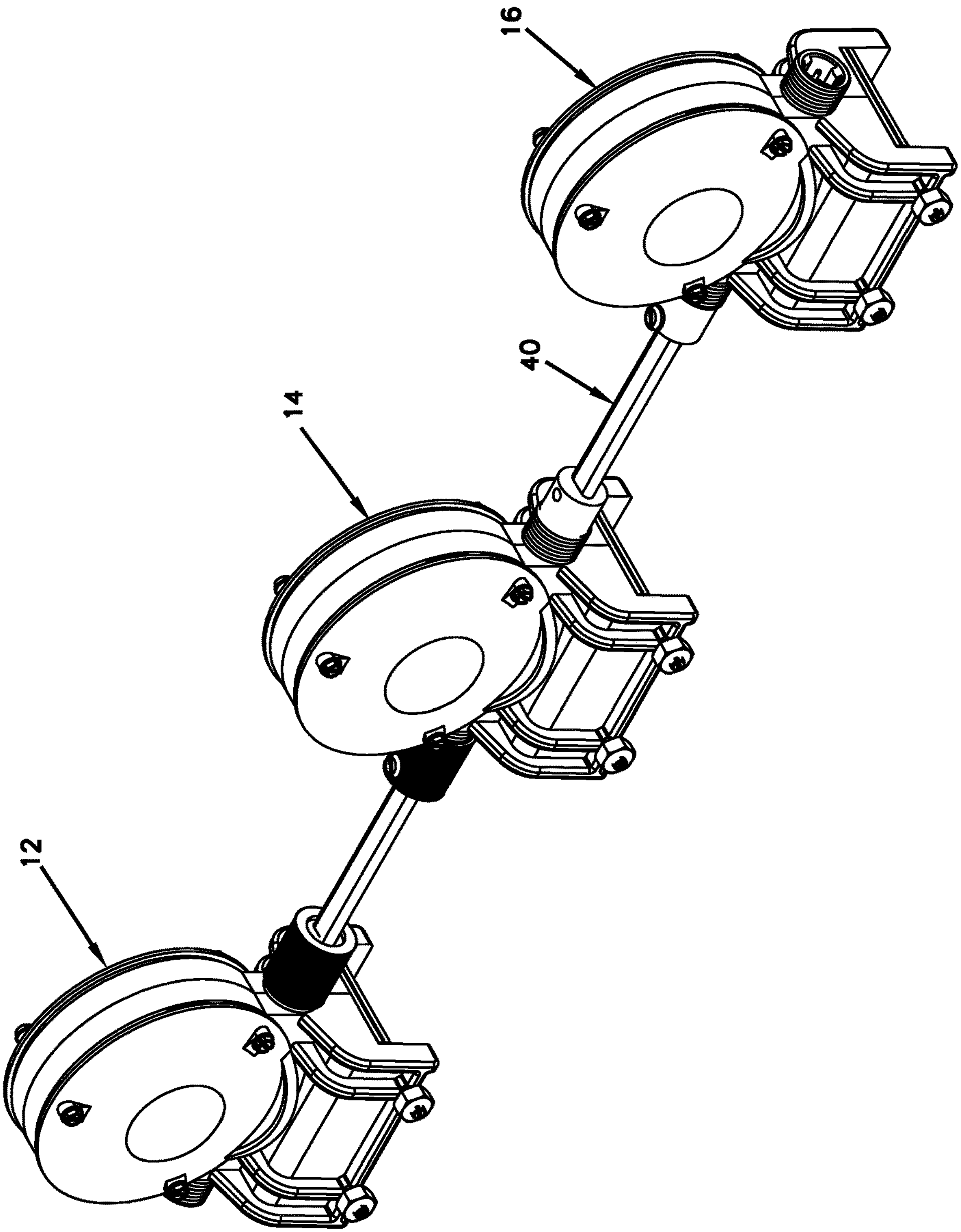
FIG. 2 is a top isometric view of three gate lamps electrically connected to each other according to the principles of the present disclosure.
Figure 3:
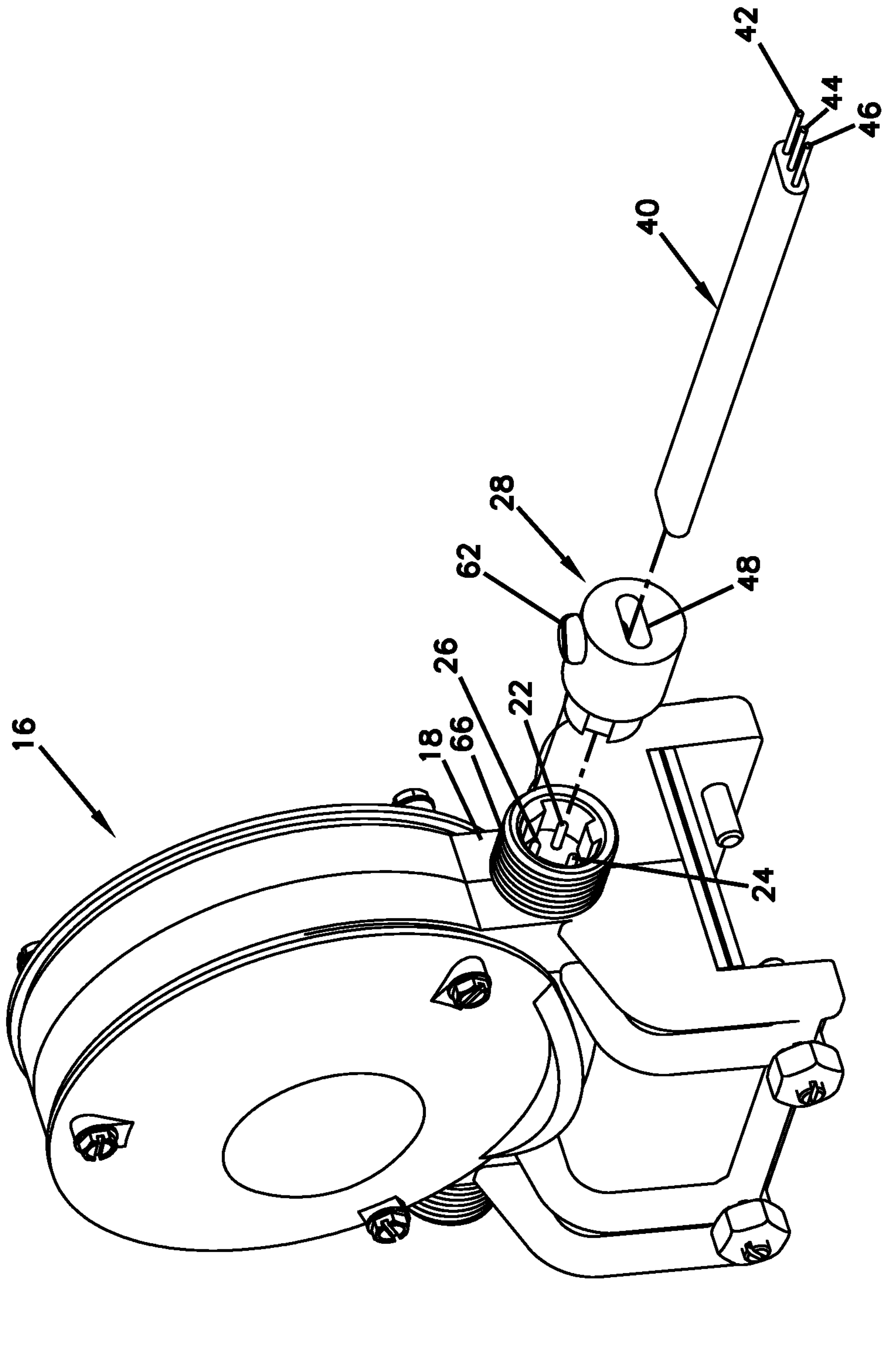
FIG. 3 is an exploded isometric view of a portion of FIG. 2.
Figure 4:
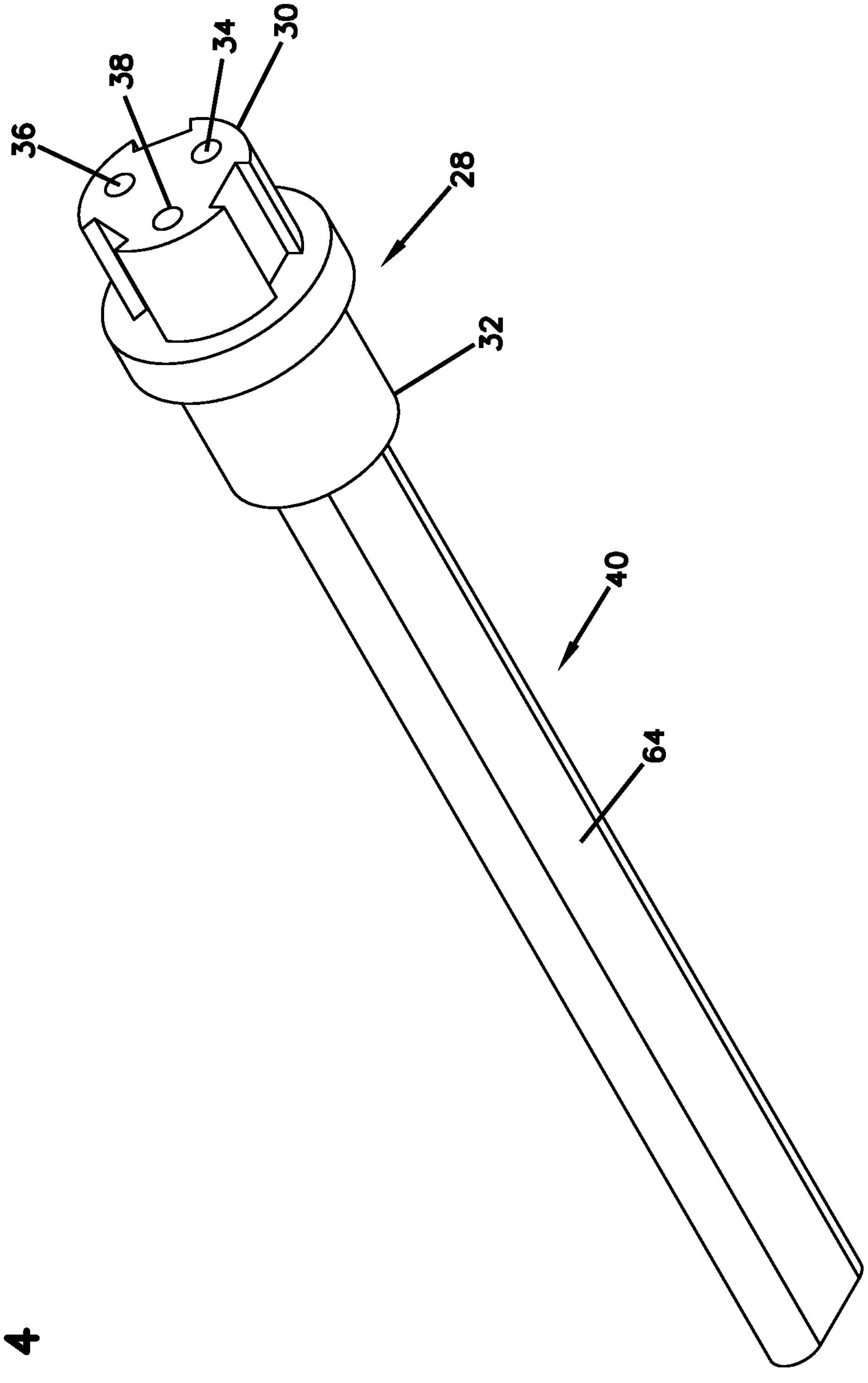
FIG. 4 is a front isometric view of the assembled connector and cord of FIG. 3.
Figure 5:
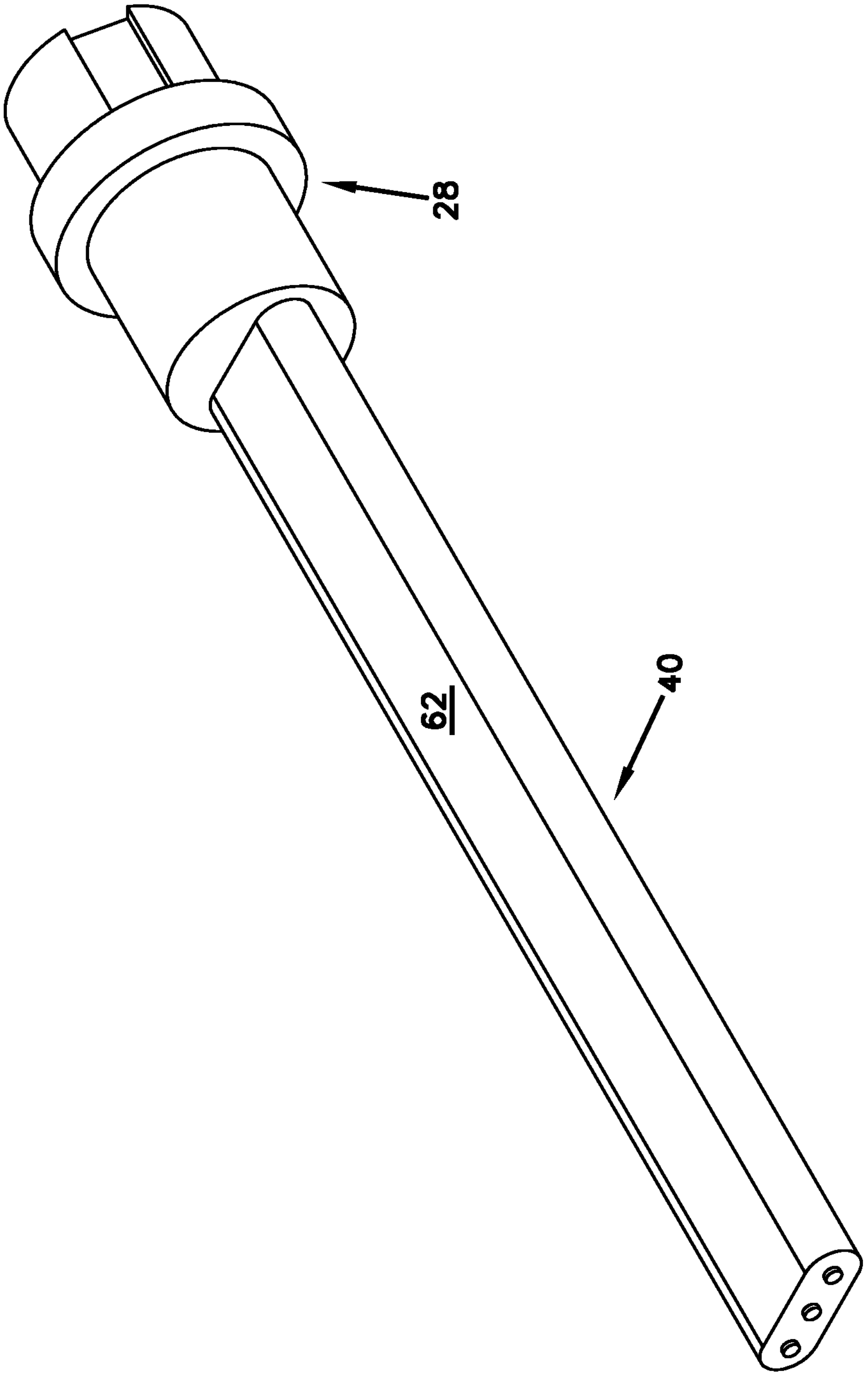
FIG. 5 is a rear isometric view of the assembled connector and cord of FIG. 3.
Figure 6:
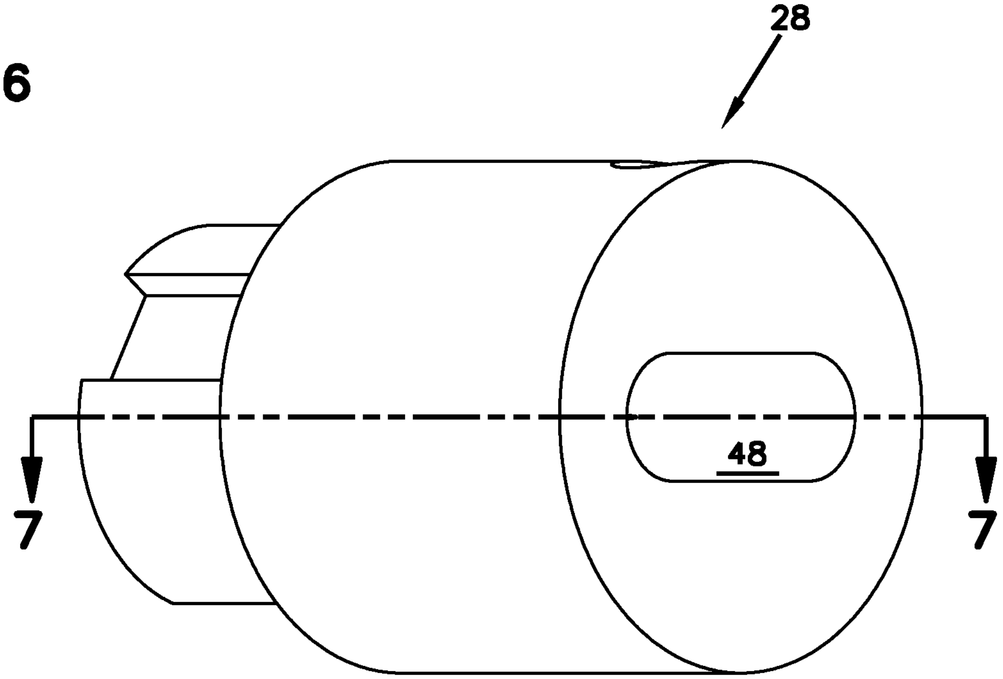
FIG. 6 is a rear isometric view of a connector of FIG. 3.
Figure 7:
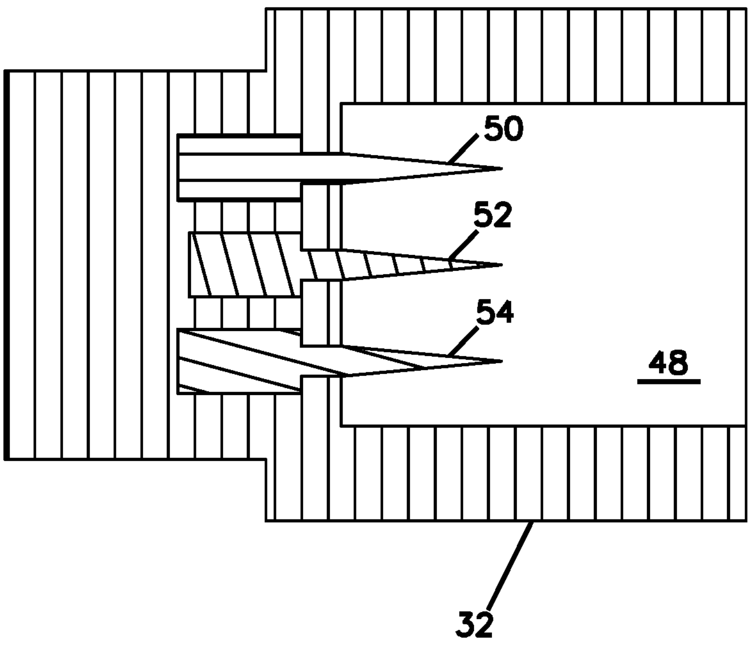
FIG. 7 is a cross sectional view of the connector of FIG. 4 along lines 4-4.
Figure 8:
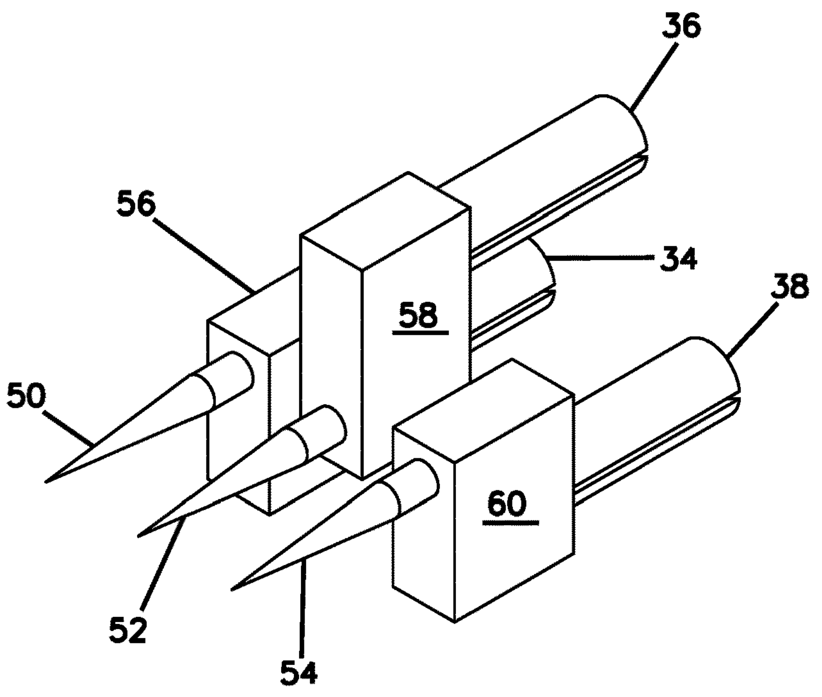
FIG. 8 is a front isometric view of the conductive components within the connector of FIG. 4 with the insulated housing removed.

Referring to FIG. 2, in the depicted embodiment the lamps 12, 14, 16 are identical and interchangeable. In the depicted embodiment, what determines whether the particular lamp stays on or flashing according to a particular timing is based on how the lamp is connected and/or configured. Accordingly, only one of the lamps 12, 14, 16 will be described in further detail below.

Referring generally to FIGS. 2-11, in the depicted embodiment, the gate lamp 16 includes a lower body portion 18 that is configured to mount to a crossing gate arm 10. In the depicted embodiment, the lower body portion 18 defines a channel in which can be fitted over the upper edge of a gate arm 10 and screwed, bolted, or clamped to the upper edge of the gate arm 10. In the depicted embodiment, the lower body portion 18 also includes a plug portion 20. The plug portion 20 includes at least a first conductive prong 22, a second conductive prong 24, and a third conductive prong 26. It should be appreciated that many other alternative configurations are also possible.

In the depicted embodiment, the gate lamp system includes a connector 28 including a first end 30 that is configured to mate with the plug portion 20 of the gate lamp 16. In the depicted embodiment, the first end 30 of the connector 28 includes a first conductive receptacle 34, a second conductive receptacle 36, and a third conductive receptacle 38. In the depicted embodiment, the connector 28 is a multi-position connector. In particular, the rotational orientation of the first end 30 of the connector 28 relative to the plug 20 dictates which conductive receptacles 34, 36, 38 receive which conductive prongs 22, 24, 26. In the depicted embodiment, depending on the rotational orientation of the connector 28 and plug 20, the lamp 16 can be made to stay on when a train is approaching, flash at a first timing sequence, or flash at a second timing sequence. It should be appreciated that many other alternative configurations are also possible.

In the depicted embodiment, the system includes an electrical cord 40 having a non-circular outer profile (e.g., a flat cord as shown). In the depicted embodiment, the electrical cord 40 includes a first conductor 42, a second conductor 44, and a third conductor 46 therein. In the depicted embodiment, each of the first, second, and third conductors 42, 44, 46 are electrically insulated from each other with a known predefined location within the electrical cord 40. It should be appreciated that the terms “cord” and “cable” are used interchangeably herein. Also it should be appreciated that the electrical cord 40 and conductors 42, 44, 46 can be used to deliver power and/or a control signal. It should be appreciated that many other alternative configurations are also possible.

In the depicted embodiment, the electrical cord 40 is connected to a second end 32 of the connector 28 such that the first conductor 42 of the electrical cord 40 is electrically connected to the first conductive receptacle 34, the second conductor 44 of the electrical cord 40 is electrically connected to the second conductive receptacle 36, the third conductor 46 of the electrical cord 40 is electrically connected to the third conductive receptacle 38. It should be appreciated that many other alternative configurations are also possible. For example, the connector 28 can be rotated relative to the plug 20 to align different conductors with different receptacles.

In the depicted embodiment, the second end 32 of the connector 28 includes an opening 48 that is shaped to axially receive and guide the electrical cord 40 into electrical engagement with conductors within the second end 32 of the connector 28. In the depicted embodiment, the shape of the opening 48 matches the shape of the external profile of the cord 40. In some embodiments, the opening 48 is tapered to facilitate insertion of the electrical cord 40. It should be appreciated that many other alternative configurations are also possible.

In the depicted embodiments, the conductors within the second end 32 of the connector 28 include a first conductive spear 50 that is configured and arranged to axially extend into the first conductor 42 of the electrical cord 40, a second conductive spear 52 that is configured and arranged to axially extend into the second conductor 44 of the electrical cord 40, and a third conductive spear 54 that is configured and arranged to axially extend into the third conductor 46 of the electrical cord 40. In the depicted embodiment, the act of extending the conductive spears 50, 52, 54 into the conductor 42, 44, 46 enables electrical connection between the two components. In the depicted embodiment, the spears 50, 52, 54 are conical in shape and displace the conductor 42, 44, 46 radially as the spear 50, 52, 54 is driving axially into the end of the conductor 42, 44, 46. It should be appreciated that many other alternative configurations are also possible.

In the depicted embodiment, a first conductive body 56 connects the first conductive spear 50 to the first conductive receptacle 34. A second conductive body 58 connects the second conductive spear 52 to the second conductive receptacle 36. A third conductive body 60 connects the third conductive spear 54 to the third conductive receptacle 38. In the depicted embodiment, the spear 50, 52, 54, the conductive body 56, 58, 60, and the receptacle 34, 36, 38 are integrally formed of a conductive material (e.g., copper, brass, etc.). In the depicted embodiment, the body portions 56, 58, 60 that connect the spears 50, 52, 54 to the receptacle 34, 36, 38 share the same structure which can facilitate their manufacturing of the connector. It should be appreciated that many other alternative configurations are also possible.

Figure 19:
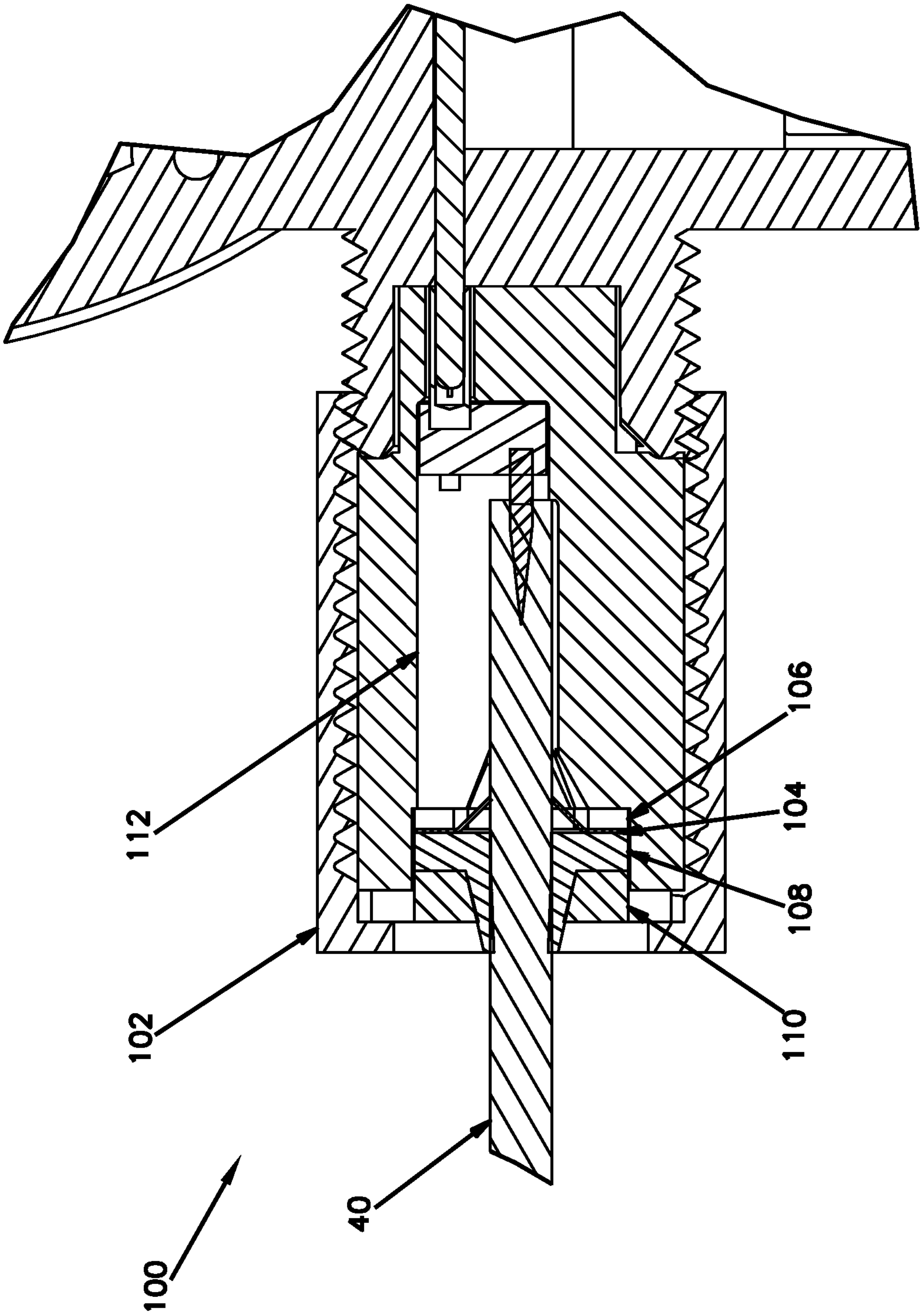
FIG. 19 is a cross sectional view of an alternative embodiment of the connector of FIG. 2.
Figure 20:
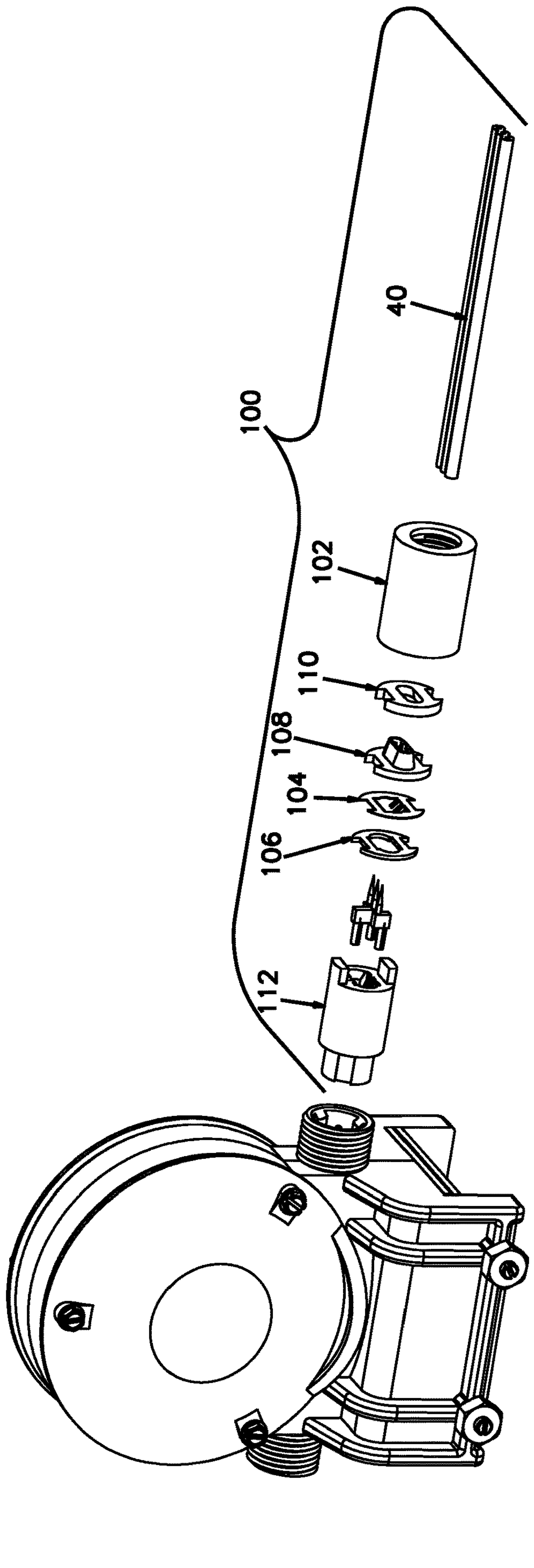
FIG. 20 is an exploded assembly view of the connector of FIG. 19.

In the depicted embodiment, the connector 28 is configured to receive a set screw 62 that is configured to secure the electrical cord 40 within the second end 32 of the connector 28. It should be appreciated that many other alternative configurations are also possible. For example, the connector 28 can be configured to clamp the end of the cord 40 in place and/or the cord 40 can be potted in place with an adhesive. Referring generally to FIGS. 19-20, an alternative embodiment of the connector 28 that secures the electrical cord 40 differently is described. The first end of the connector 100 shares the same features and the first end of the connector 28. However, the second end of the connector 100 is different than the second end 32 of the connector 28 in that the second end of the connector 100 is configured to secure the electrical cord 40 via a self-locking strain relief system.

In the depicted embodiment, the electrical cord 40 is connected to the gate lamp by pushing the cord 40 into engagement with the spears 50, 52, 54 at the second end of the connector 100 and then tightening the retaining collar 102. The act of pushing the cord 40 into engagement with the spears 50, 52, 54 deflects the cable grip plug 104 and causes it to grab the sheathing of the cable to prevent it from being pulled outwardly. In the depicted embodiment, the cable grip plug 104 is a thin sheet of steel with feet that deflect and bite into the cable sheathing. The distance between the teeth and the upper edge of the cable opening is substantially larger than the diameter of the conductors in the electrical cord 40. The axial location of the cable grip plug 104 is positioned to prevent shorting of the cable (i.e., the teeth are configured to not be able to contact the conductors in the cord 40.

In the depicted embodiment, the connector 100 is weatherproof (waterproof). In the depicted embodiment, the second end of the connector 100 includes a first seal 106, a second seal 108, and a washer 110. When the collar 102 is tightened, the seals 106, 108 are compressed and deform, thereby preventing moisture from permeating the connection between the connector body and the electrical cord. In the depicted embodiment, the first seal 106 includes assistive on both primary surfaces, and the second seal 108 is comprised of a soft resilient material (e.g., rubber). In the depicted embodiment, the cable grip plug 104, the first and second seals 106, 108 and the washer 110 all include upper and lower locator notches that align with the outwardly extending tab of the connector body 112. This configuration prevents these internal components from rotating as the collar 102 is tightened.

Figure 9:
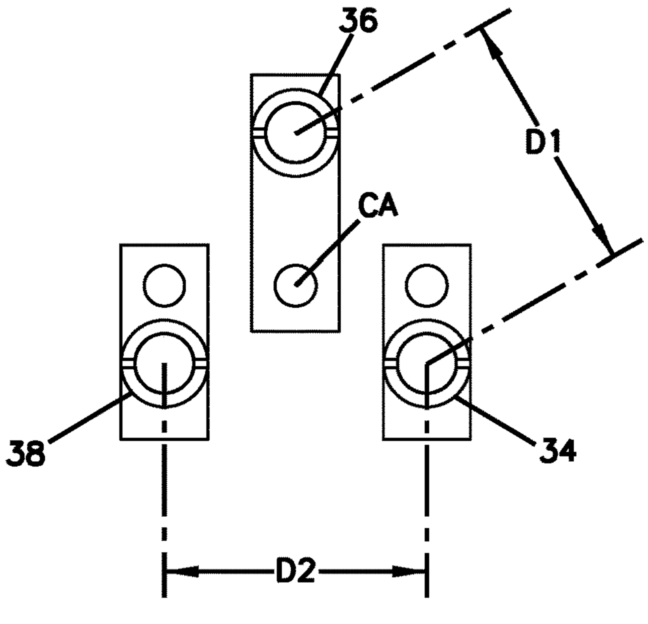
FIG. 9 is a rear end view of the conductive components of FIG. 8.
Figure 10:
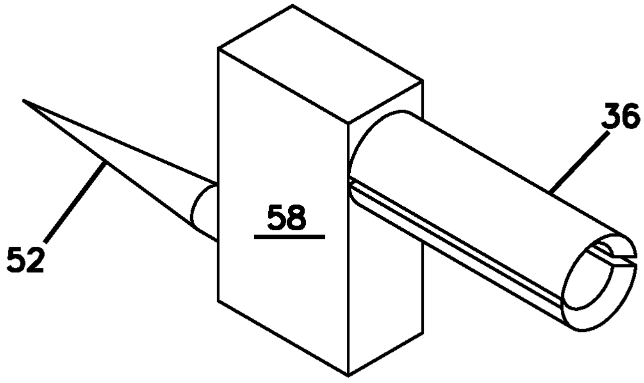
FIG. 10 is an isometric view of a single conductive component of the connector of FIG. 4.
Figure 11:
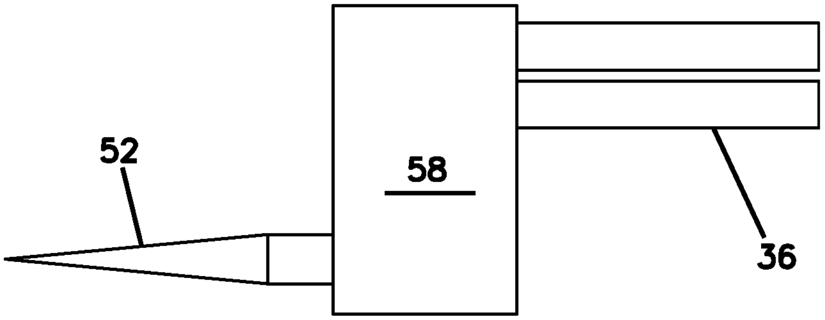
FIG. 11 is a side view of the conductive component of FIG. 10.

Referring particularly to FIG. 9, in the depicted embodiment, the first conductive receptacle 34, the second conductive receptacle 36, and the third conductive receptacle 38, are spaced apart and positioned equal distance from a central axis CA of the connector 28. In the depicted embodiment, the distance D1 between the first conductive receptacle 34 and the second conductive receptacle 36 is the same as the distance D2 between the first conductive receptacle 34 and the third conductive receptacle 38. In the depicted embodiment, the receptacles 34, 36, 38 are positioned 120 degrees relative to each other. It should be appreciated that many other alternative configurations are also possible.

In the depicted embodiment, the electrical cord 40 includes a generally flat top periphery portion 62 and a generally flat bottom periphery portion 64. In the depicted embodiment, the first conductor 42, the second conductor 44, and the third conductor 46 of the electrical cord 40 are arranged linearly with the body of the cord 40. Likewise, the spears 50, 52, 54 are also arranged linearly in a row so that they axially align with the conductors 42, 44, 46 in the cord 40. In the depicted embodiment, the plug 20 includes a cylindrical housing defining a recess wherein the first, second, and third prongs 22, 24, 26 are located. The outer surface 66 of the cylindrical housing is threaded. In the depicted embodiment, the cylindrical body of the connector 28 includes an annual flange 78 located between the first and second end of the connector 30, 32. In the depicted embodiment, a cap engages the annular flange 78 configured to engage the threads 66 to secure the connector to the plug 20. It should be appreciated that many other alternative configurations are also possible.

In the depicted embodiment, the system includes an inline connector 68 comprising a first end 70 and a second end 72. In the depicted embodiment, each end is configured to axially receive and secure a distal end of an electrical cord 74, 76. The inline connector 68 can facilitate installation of a lamp system where the connector and cord are pre-connected. It should be appreciated that many other alternative configurations are also possible.

Figure 12:
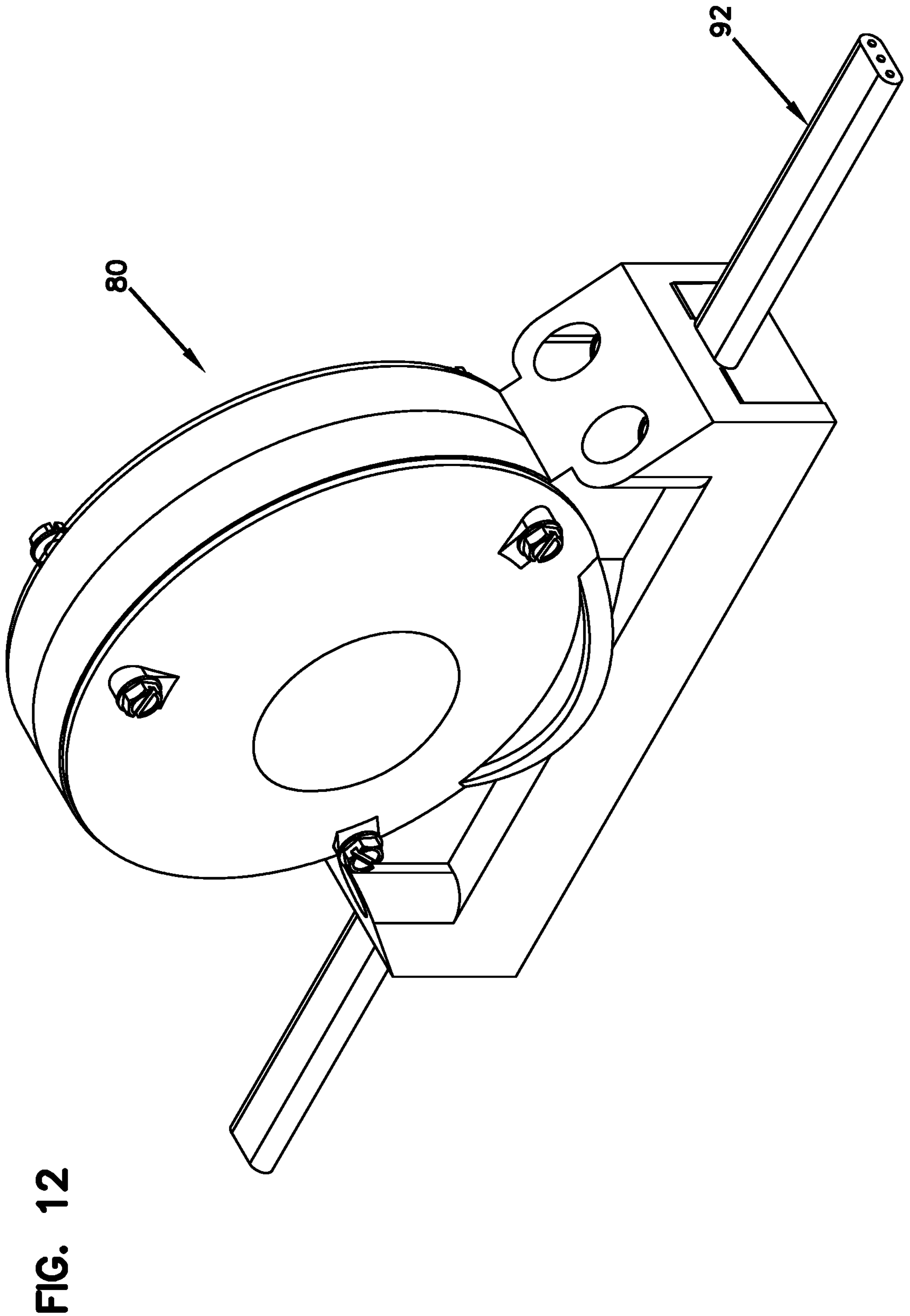
FIG. 12 is an isometric view of an alternative embodiment of the gate lamp of FIG. 2.
Figure 13:
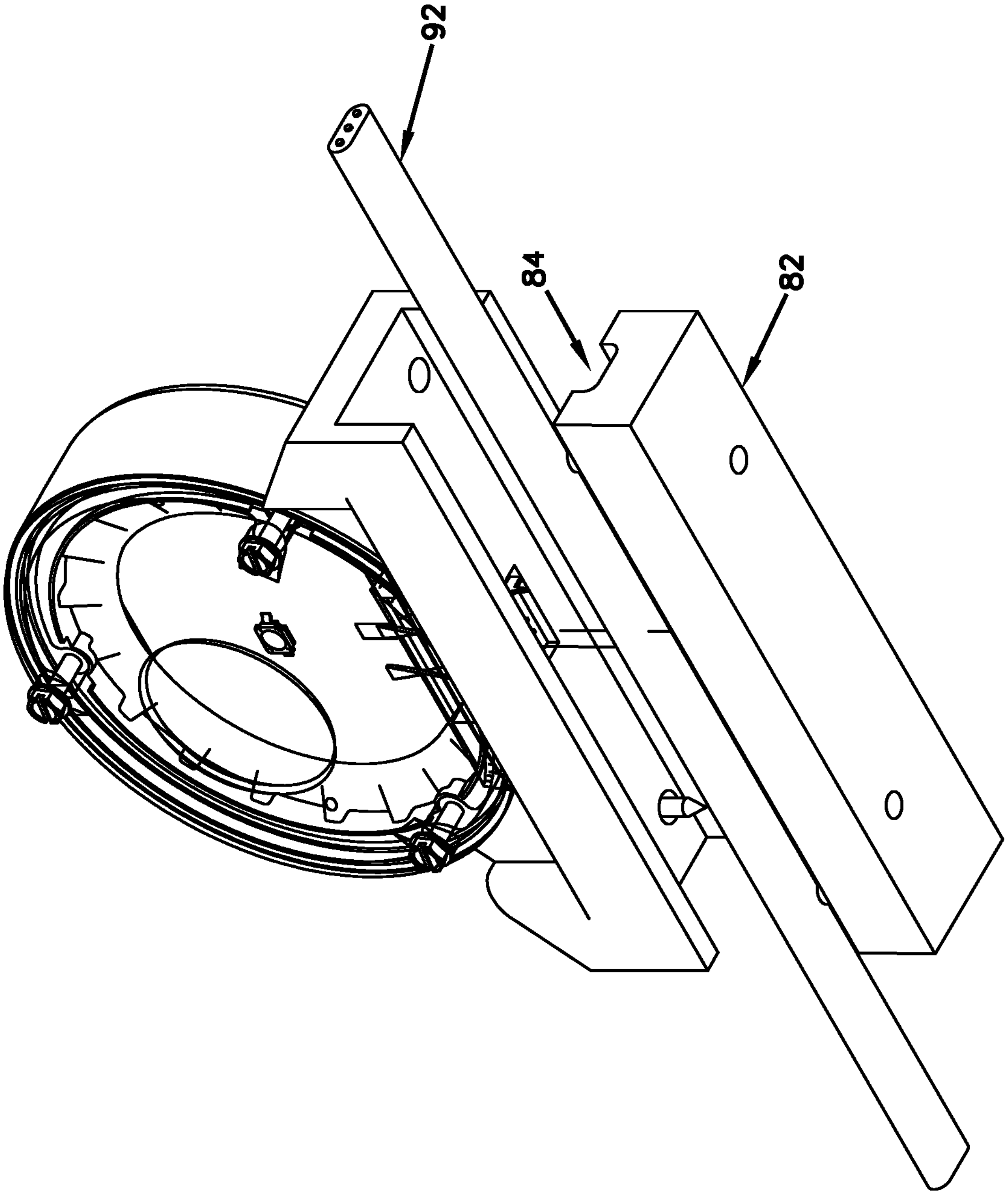
FIG. 13 is an exploded view of the gate lamp of FIG. 12.
Figure 14:
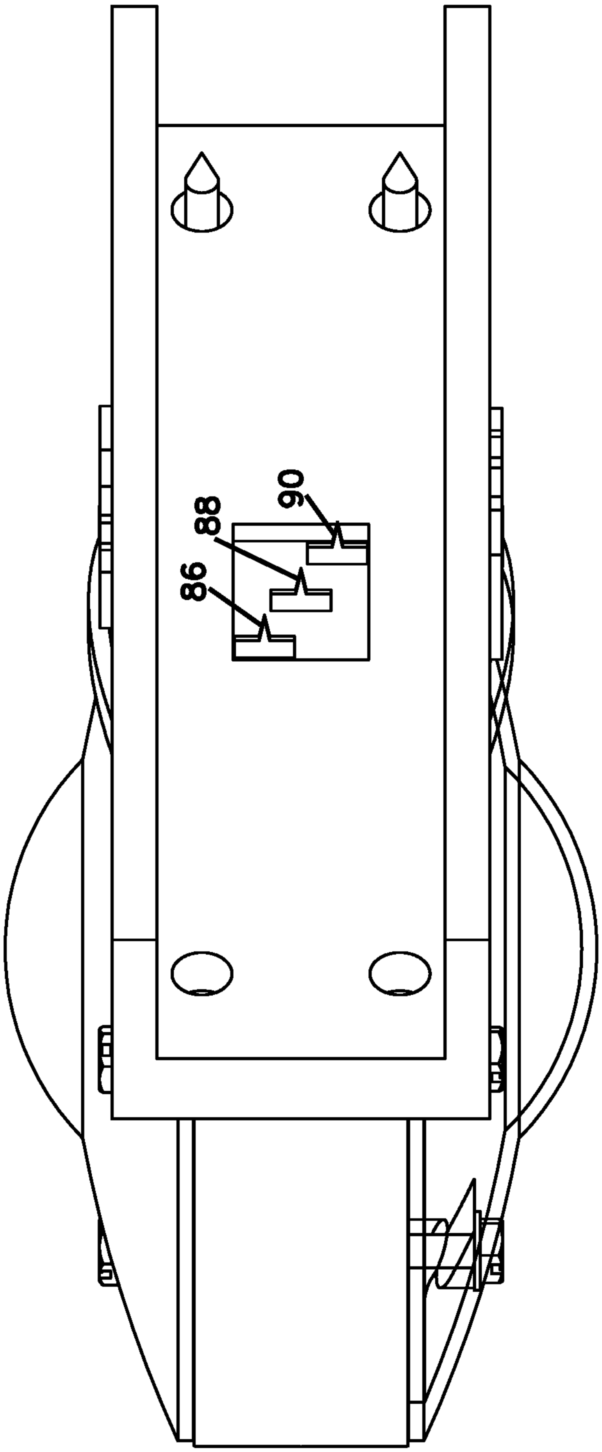
FIG. 14 is a bottom isometric view of the gate lamp of FIG. 12.
Figure 15:
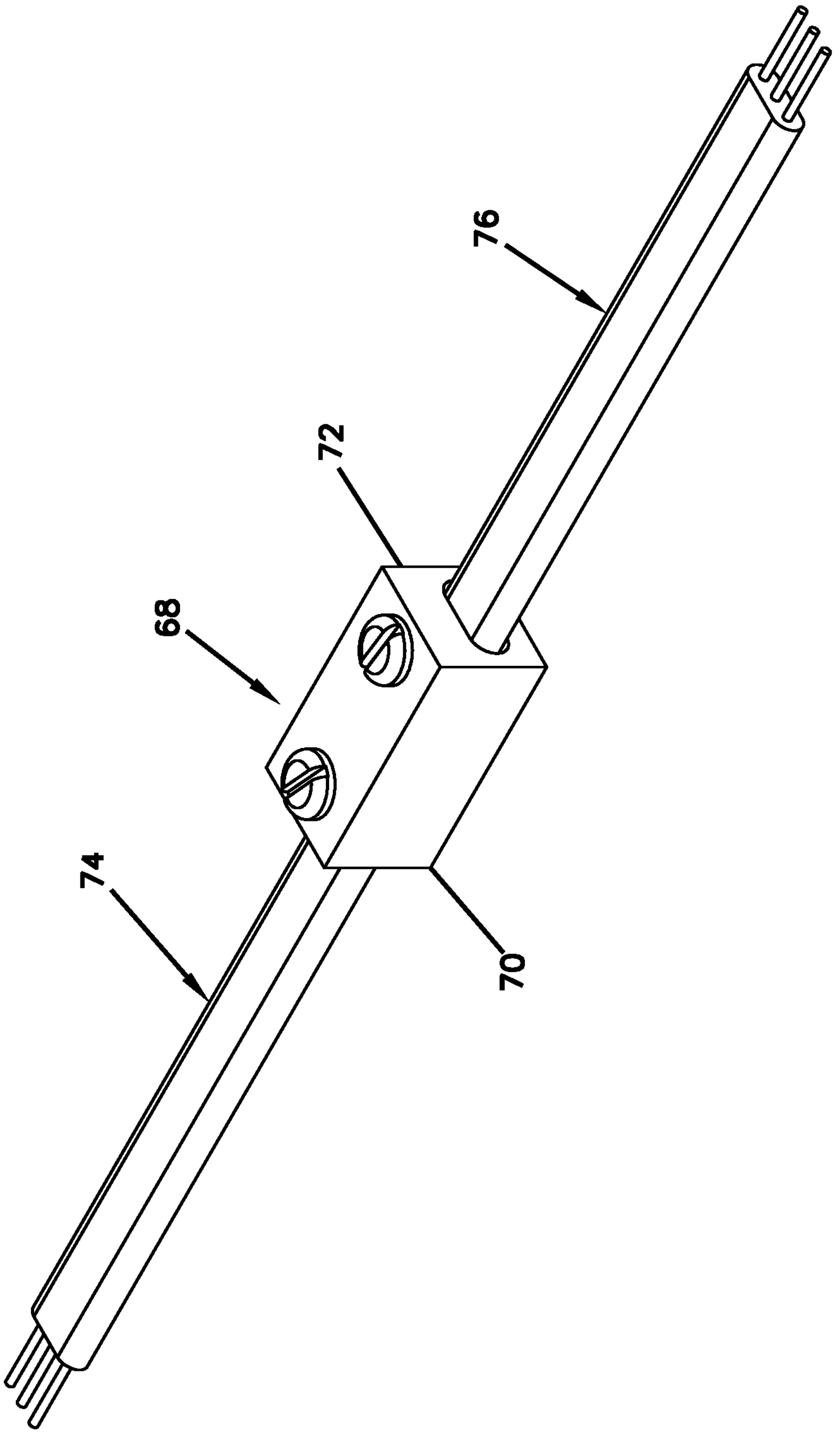
FIG. 15 is an isometric view of an inline connector connecting two flat cords according to the principles of the present disclosure.
Figure 16:
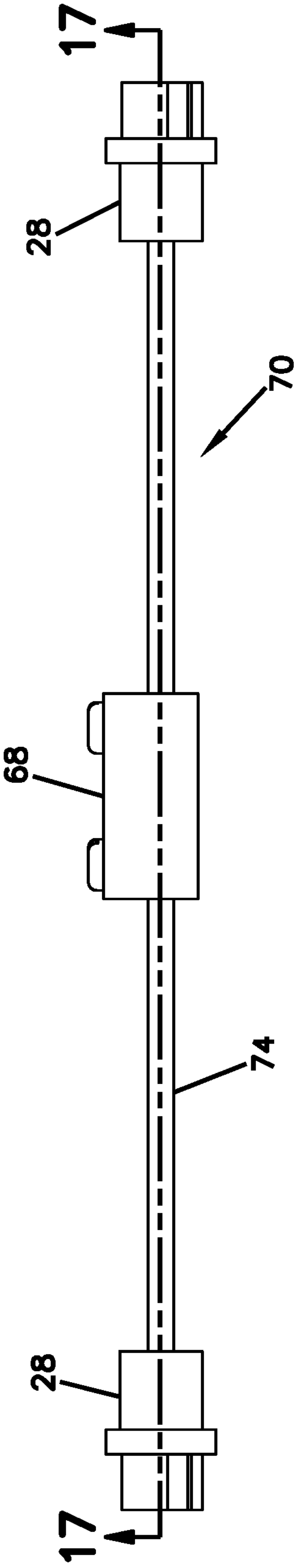
FIG. 16 is a side view of the inline connector connecting two assembled connectors and cord of FIG. 4.
Figure 17:
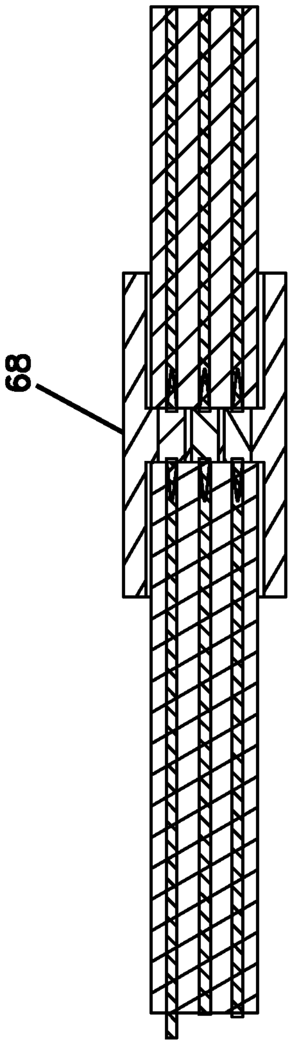
FIG. 17 is a cross sectional view of a portion of FIG. 16 along lines 17-17.
Figure 18:
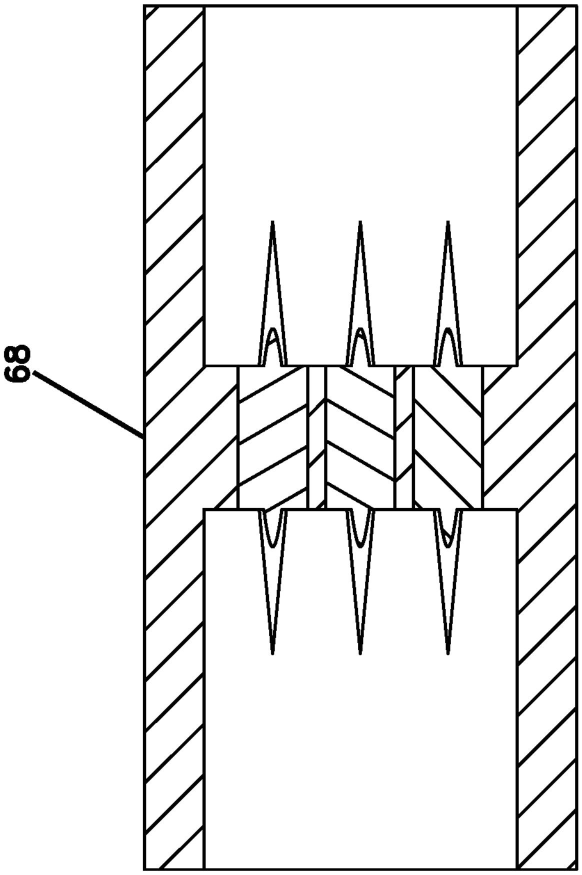
FIG. 18 is a cross sectional view of the inline connector of FIG. 15.

Referring to FIGS. 12-14, an alternative embodiment of a gate lamp system is shown. In the depicted embodiment, a gate lamp having an upper portion 80 includes a lamp and a lower portion 82 that is configured to be secured to a crossing gate arm 10. In the depicted embodiment, the upper portion 80 and the lower portion 82 define a through channel 84. In the depicted embodiment, the upper portion 80 includes spaced apart staggered conductive spears 86, 88, 90 that extend downwardly towards the lower portion 82. In the depicted embodiment, the electrical cord 92 extends through the gate lamp in the through channel 84. The conductive spears 86, 88, 90 are arranged and configured to pierce and make electrical connection with spaced apart longitudinal conductors within the electrical cord 92.

The present disclosure also provides a method of installing a gate lamp to a crossing gate arm comprising the steps of securing a gate lamp onto a crossing gate arm, connecting the gate arm to a power source by rotationally orientating a connector to a plug on the gate lamp, axially driving a flat cord into mechanical and electrical engagement with the connector, and securing the flat cord onto the crossing gate arm. It should be appreciated that the method can include more or less steps and that the steps can occur in a number of different sequences. In the depicted embodiment, the step of axially driving a flat cord into mechanical and electrical engagement with the connector occurs before the connector is electrically connected to the plug.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A gate lamp system comprising:

a gate lamp including a lower body portion that is configured to mount to a crossing gate arm, the lower body portion includes a plug portion, the plug portion includes at least a first conductive prong, a second conductive prong, and a third conductive prong;

a connector including a first end that is configured to mate with the plug portion of the gate lamp, the first end of the connector includes a first conductive receptacle, a second conductive receptacle and a third conductive receptacle, wherein the connector is a multi-position connector such that the relative rotational orientation of the first end of the connector determines which conductive receptacle will receive which conductive prongs, the first conductive receptacle, the second conductive receptacle, and the third conductive receptacle being spaced apart and positioned equal distance from a central axis of the connector;

an electrical cord including a first conductor, a second conductor, and a third conductor therein, wherein each of the first, second, and third conductors are electrically insulated from each other, the electrical cord including a generally flat top periphery portion and a generally flat bottom periphery portion, the first conductor, the second conductor, and the third conductor of the electrical cord being arranged linearly with the body of the cord; and wherein the electrical cord is connected to a second end of the connector such that the first conductor of the electrical cord is electrically connected to the first conductive receptacle, the second conductor of the electrical cord is electrically connected to the second conductive receptacle, and the third conductor of the electrical cord is electrically connected to the third conductive receptacle.

2. The gate lamp system of claim 1, wherein the second end of the connector includes an opening that is shaped to axially receive and guide the electrical cord into electrical engagement with conductors within the second end of the connector.

3. The gate lamp system of claim 2, wherein the distance between the first conductive receptacle and the second conductive receptacle is the same as the distance between the first conductive receptacle and the third conductive receptacle.

4. The gate lamp system of claim 2, wherein the conductors within the second end of the connector include a first conductive spear that is configured and arranged to axially extend into the first conductor of the electrical cord, a second conductive spear that is configured and arranged to axially extend into the second conductor of the electrical cord, and a third conductive spear that is configured and arranged to axially extend into the third conductor of the electrical cord.

5. The gate lamp system of claim 4, wherein a first conductive body connects the first conductive spear to the first conductive receptacle, wherein a second conductive body connects the second conductive spear to the second conductive receptacle, and wherein a third conductive body connects the third conductive spear to the third conductive receptacle.

6. The gate lamp system of claim 1, wherein the connector is configured to receive a set screw that is configured to secure the electrical cord within the second end of the connector.

7. The gate lamp system of claim 1, wherein the plug includes a cylindrical housing defining a recess wherein the first, second, and third prongs are located, and wherein the outer surface of the cylindrical housing is threaded.

8. The gate lamp system of claim 1, further comprising an inline connector comprising a first end and a second end, wherein each end is configured to axially receive and secure a distal end of the electrical cord.

9. A gate lamp system comprising:

a gate lamp having an upper portion that includes a lamp;

a lower portion that is configured to be secured to a crossing gate arm;

wherein the upper portion and the lower portion define a through channel; and wherein the upper portion includes spaced apart conductive spears that extend downwardly towards the lower portion.

10. The gate lamp system of claim 9, further comprising an electrical cord that extends through the gate lamp in the through channel, wherein the conductive spears are arranged and configured to pierce and make electrical connection with spaced apart longitudinal conductors within the electrical cord.

11. A lamp system for a railroad crossing gate comprising:

a plurality of lamps, each of the plurality of lamps including a connector; and an electrical cord defined by a longitudinal axis and adapted to electrically connect to at least one of the plurality of lamps via the connector of the lamp, the electrical cord comprising a plurality of longitudinal, spaced apart conductors insulated from one another and adapted to deliver illumination control signals to at least one of the plurality of lamps, the electrical cord having a non-circular outer profile;

wherein each of the connectors includes a body defining a non-circular opening adapted to receive an axial end portion of the electrical cord; and wherein each of the connectors includes a plurality of conductive spears at least partially positioned within the non-circular opening, the plurality of conductive spears being adapted to make electrical contact with the plurality of longitudinal spaced apart conductors when the electrical cord is axially driven into mechanical engagement with the connector such that the electrical cord is pierced by the plurality of conductive spears.

12. The lamp system of claim 11, wherein connecting the electrical cord to the connector of a first of the plurality of lamps provides a first illumination control signal to the first of the plurality of lamps; and wherein connecting the electrical cord to the connector of a second of the plurality of lamps provides a second illumination control signal to the second of the plurality of lamps, the second illumination control signal being different from the first illumination control signal.

13. The lamp system of claim 12, wherein the first illumination control signal is a constant illumination control signal and the second illumination control signal is an alternately flashing illumination control signal.

14. The lamp system of claim 12, wherein the first illumination control signal is an alternately flashing illumination control signal according to a first flashing timing, and wherein the second illumination control signal is an alternately flashing illumination control signal according to a second flashing timing that is different from the first flashing timing.

* * * * *